US009988037B2

(12) United States Patent
Prakah-Asante et al.

(10) Patent No.: US 9,988,037 B2
(45) Date of Patent: Jun. 5, 2018

(54) DRIVING SCENARIO PREDICTION AND AUTOMATIC VEHICLE SETTING ADJUSTMENT

(71) Applicant: Ford Global Technologies, LLC, Dearborn, MI (US)

(72) Inventors: Kwaku O. Prakah-Asante, Commerce Township, MI (US); Hsin-hsiang Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 498 days.

(21) Appl. No.: 14/253,340

(22) Filed: Apr. 15, 2014

(65) Prior Publication Data

US 2015/0291146 A1 Oct. 15, 2015

(51) Int. Cl.

| B60G 17/018 | (2006.01) |
|---|---|
| B60W 10/06 | (2006.01) |
| B60W 10/11 | (2012.01) |
| B60W 10/188 | (2012.01) |
| B60W 10/22 | (2006.01) |
| B60W 50/00 | (2006.01) |

(52) U.S. Cl.
CPC ............ B60W 10/06 (2013.01); B60W 10/11 (2013.01); B60W 10/188 (2013.01); B60W 10/22 (2013.01); B60W 50/0097 (2013.01); B60W 2050/0078 (2013.01); B60W 2550/402 (2013.01)

(58) Field of Classification Search
CPC .... B60W 10/06; B60W 10/11; B60W 10/188; B60W 10/22; B60W 30/02; B60W 2510/06; B60W 2510/182; B60W 2510/22; B60W 2710/06; B60W 2710/182; B60W 2710/22
USPC .......................................... 701/37; 180/65.2
See application file for complete search history.

(56) References Cited

U.S. PATENT DOCUMENTS

| 6,092,005 A * | 7/2000 | Okada ..................... G01C 21/26 340/439 |
|---|---|---|
| 6,998,972 B2 * | 2/2006 | Geisler .................. G06Q 10/00 340/438 |
| 7,821,421 B2 * | 10/2010 | Tamir ................. G06Q 30/0283 340/425.5 |

(Continued)

*Primary Examiner* — Shardul D Patel
(74) *Attorney, Agent, or Firm* — Jennifer M. Stec; Brooks Kushman P.C.

(57) ABSTRACT

A vehicle processor may track vehicle input during vehicle traversal of a travel path within a location region, match the vehicle input against a condition of a rule, such that when the vehicle input matches the condition, a driving scenario indication of a type corresponding to the rule is associated with the location region, and update a location demand identifier associated with the location region based on the driving scenario indication. The vehicle processor may further identify a location demand identifier for an approaching location region, the location demand identifier determined according to vehicle input satisfying a rule identifying a driving scenario and indicative of a level of likelihood of occurrence of the driving scenario; and when the location demand identifier exceeds a vehicle sensitivity level, provide a settings update to the vehicle to improve vehicle maneuverability during occurrence of the driving scenario.

15 Claims, 9 Drawing Sheets

(56) References Cited

U.S. PATENT DOCUMENTS

| | | | | |
|---|---|---|---|---|
| 8,301,108 | B2* | 10/2012 | Naboulsi | G06F 17/00 340/575 |
| 8,577,550 | B2* | 11/2013 | Lu | B60W 10/06 340/435 |
| 8,577,703 | B2* | 11/2013 | McClellan | G06Q 40/02 705/7.11 |
| 2004/0074682 | A1* | 4/2004 | Fussey | B60K 6/12 180/65.21 |
| 2007/0100551 | A1* | 5/2007 | Ishikura | B60T 8/17551 701/301 |
| 2008/0133092 | A1* | 6/2008 | Hozumi | B60N 2/0244 701/49 |
| 2013/0073113 | A1* | 3/2013 | Wang | B60K 6/445 701/1 |

* cited by examiner

DRIVING SCENARIO PREDICTION AND AUTOMATIC VEHICLE SETTING ADJUSTMENT

TECHNICAL FIELD

The disclosure generally relates to predicting driving scenarios across vehicle travel paths, and the automatic application of anticipatory changes to vehicle settings according to the predicted driving scenarios.

BACKGROUND

Information regarding vehicle travel routes may be determined through connected services or built-in maps. For example, a vehicle may identify travel route information such as speed limits, road features, and traffic condition, and may use that information to find the best vehicle settings for driver safety and convenience. However, such connected services or built in maps are expensive to implement and may not be always available.

SUMMARY

In a first illustrative embodiment, a system includes a vehicle processor configured to track vehicle input during vehicle traversal of a travel path within a location region, match the vehicle input against a condition of a rule, such that when the vehicle input matches the condition, a driving scenario indication of a type corresponding to the rule is associated with the location region, and update a location demand identifier associated with the location region based on the driving scenario indication.

In a second illustrative embodiment, a system includes a vehicle processor configured to identify a location demand identifier for an approaching location region, the location demand identifier determined according to vehicle input satisfying a rule identifying a driving scenario and indicative of a level of likelihood of occurrence of the driving scenario; and when the location demand identifier exceeds a vehicle sensitivity level, provide a settings update to the vehicle to improve vehicle maneuverability during occurrence of the driving scenario.

In a third illustrative embodiment, a method includes identifying a location demand identifier for an approaching location region, the location demand identifier determined according to vehicle input satisfying a rule identifying a driving scenario and indicative of a level of likelihood of occurrence of the driving scenario; and when the location demand identifier exceeds a vehicle sensitivity level, providing, by a vehicle processor, a settings update to the vehicle to improve vehicle maneuverability during occurrence of the driving scenario.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A predictive driving control system may be configured to perform anticipatory changes to vehicle settings, based on identification of a vehicle entering a region associated with a previously-learned indication of higher driver demand. These vehicle settings updates may, for example, improve maneuverability of the vehicle during an anticipated upcoming driving scenario. As some example, and depending on the type of upcoming driving scenario, the vehicle may automatically pre-charge brakes, stiffen suspension settings or restart an internal combustion engine.

The system may be configured to predict driving scenario based on inputs such as driver actions, vehicle state and/or vehicle environmental conditions, as applied to predefined rules defining various driving scenarios. For example, the system may be configured to apply the predefined rules to vehicle inputs collected during vehicle traversal of a travel route within a location region, such that satisfaction of a rule allows the system to identify that the specific driving scenario defined by the rule is experienced within the location region (e.g. sharp curve, intersection, rough road, etc.).

The system may be further configured to determine location demand indications based on previously-determined driving scenarios for a location region. For example, the system may be configured to determine how likely the driving scenario is to reoccur, based on a frequency of occurrence of the driving scenario within the location region. Accordingly, rather than merely responding to current driving situations, the system may forecast an anticipated driving demand based on the previously computed scenario occurrences. This approach may be effective because higher driver demands may be correlated with driving scenarios that have a relatively high likelihood of reoccurrence. As one example, a location region having high driver demand due to road geometry may tend to reoccur for successive traversals of the road by the driver.

Moreover, because the driving demand and scenarios are computed based on the particular driver of the vehicle, the forecasted driving scenario may be personalized to the specific driving behavior of the driver. Thus, using the forecasted driving scenario and demand associated with a region into which the vehicle is entering, the system may be configured to provide personalized prediction and mitigation of upcoming driving scenarios, by automatically adjusting settings responsive to the particular driving style of the driver.

Figure 1:
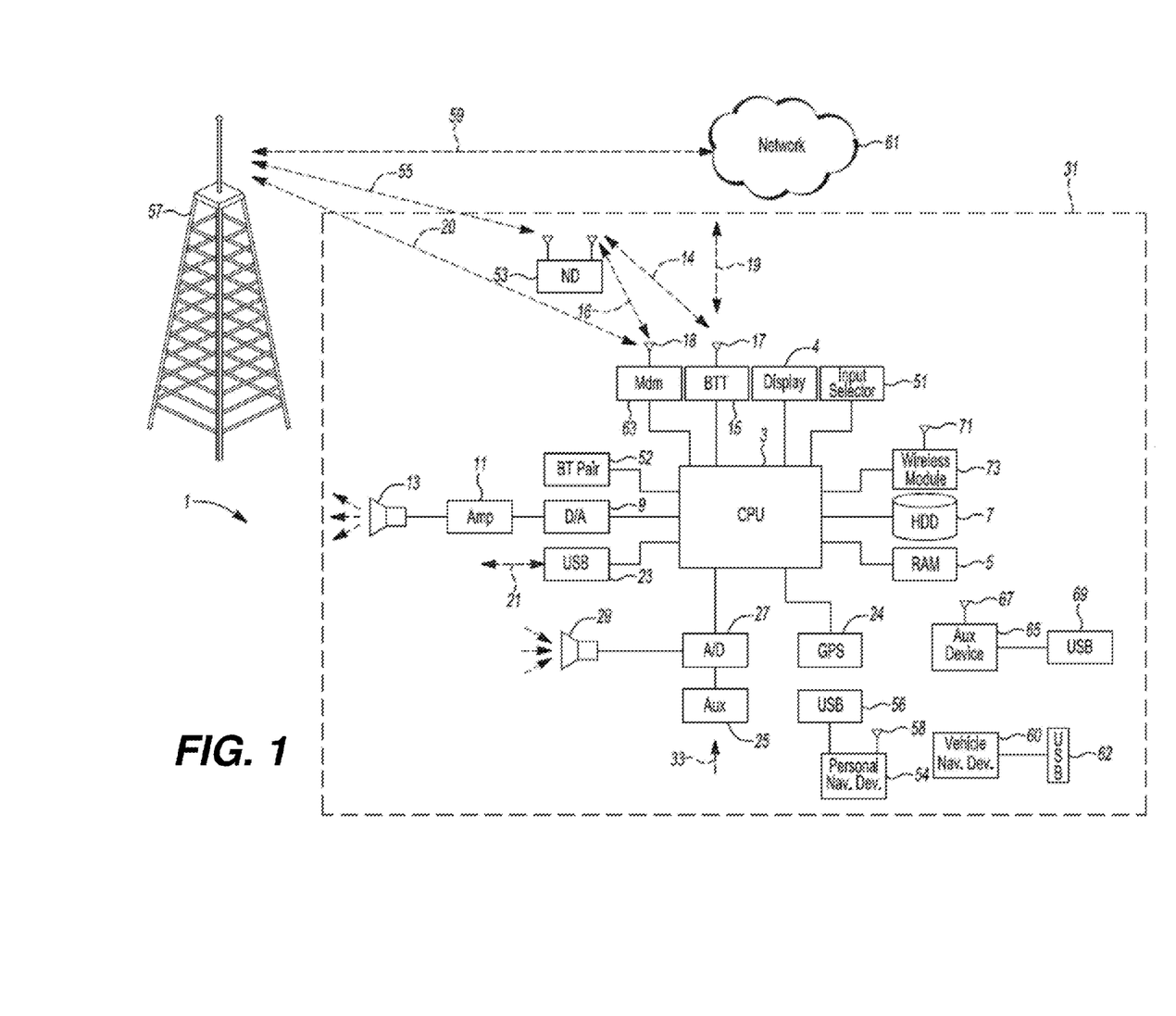
FIG. 1 illustrates an exemplary block topology of a vehicle infotainment system implementing a user-interactive vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/ Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
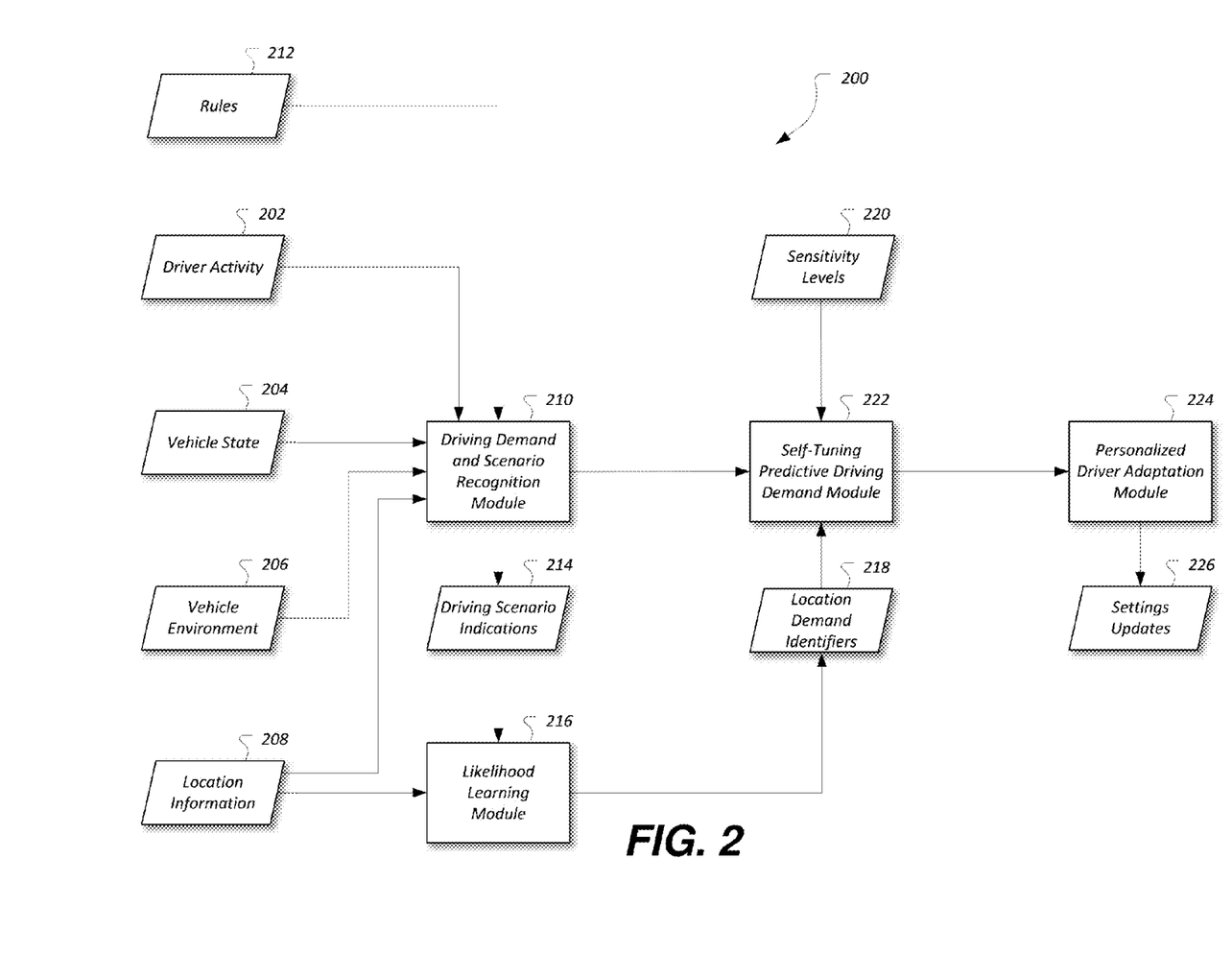
FIG. 2 illustrates an exemplary block diagram of a system for predictive driving demand and scenario identification.

FIG. 2 illustrates an exemplary block diagram 200 of a system for predictive driving demand and scenario identification. The modules of the exemplary system may be implemented by one or more processors or microprocessors of the vehicle 31 (such as the CPU 3 of the VCS 1) configured to execute firmware or software programs stored on one or more memory devices of the vehicle 31 (such as the storage 5 and 7). As illustrated, the system includes a driving demand and scenario recognition module 210 configured to receive information including driver activity 202, vehicle state 204, vehicle environment 206, and location information 208, and utilize a set of rules 212 to determine driving scenario indications 214 based on the received inputs. The system further includes a likelihood learning module 216 configured to receive and weight the driving scenario indications 214 determined by the driving demand and scenario recognition module 210 to determine location demand identifiers 218. The system also includes a self-tuning predictive driving demand module 222 configured to receive the location demand identifiers 218 from the likelihood learning module 216, and utilize sensitivity levels 220 to determine upcoming high demand locations. The system also includes a personalized driver adaptation module 224 configured to receive the determinations of upcoming high demand from the self-tuning predictive driving demand module 222 and automatically apply a settings updates 226 to the vehicle 31 systems to improve vehicle maneuverability, responsive to the particular driving style of the driver and type of location demand identifier 218. It should be noted that the modularization illustrated in the diagram 200 is exemplary, and other arrangements or combinations of elements including more, fewer, or differently separated modules may be used.

The driving demand and scenario recognition module 210 may be configured to identify a driving scenario indication 214 currently being experienced by the vehicle 31 based on inputs such as driver activity 202, vehicle state 204, vehicle environment 206, and location information 208. The driver activity 202 may include information descriptive of inputs provided by the driver to the vehicle 31. For example, the driver activity 202 may include information such as steering wheel angle and pedal inputs. The vehicle state 204 may include information descriptive of the current vehicle 31 state. For example, the vehicle state 204 may include information such as longitudinal acceleration of the vehicle 31, lateral acceleration of the vehicle 31, and vehicle 31 yaw rate. The vehicle environment 206 may include information descriptive of the current environment in which the vehicle 31 may operate. For example, the vehicle environment 206 may include information such as weather conditions, day of the week, and time of day. The location information 208 may include information descriptive of the current location of the vehicle 31. For example, the location information 208 may be determined according to information provided to the GPS input 24 of the CPU 3. As another example, location information 208 may be received according to a location identification feature of a nomadic device 53 connected to the VCS 1. As one possibility, inputs such as one or more aspects of driver activity 202, vehicle state 204, vehicle environment 206 may be retrieved via a vehicle 31 bus (e.g., a vehicle controller area network (CAN) bus). As some other possibilities, inputs may be received from auxiliary sensors (e.g., auxiliary longitudinal and lateral location sensors), or from vehicle 31 systems apart from the vehicle bus, such as from a safety or stability control system of the vehicle 31.

The driving demand and scenario recognition module 210 may be configured to utilize a set of rules 212 to facilitate the determination of the driving scenario indications 214 from the received inputs (e.g., driver activity 202, vehicle state 204, vehicle environment 206, location information 208, etc.). Based on the received inputs, the driving demand and scenario recognition module 210 may be configured to match the received inputs to with one or more system rules 212. Each rule 212 is defined to indicate a driving scenario indication 214 for the vehicle 31 when the conditions of the rule 212 match the inputs. An exemplary set of rules 212 for identifying driving scenario indications 214 is illustrated in Table 1:

TABLE 1

| Driving Scenario | Rule |
|---|---|
| High acceleration demand | (accelerator pedal position > $threshold_{acc\_pedal}$) OR (longitudinal acceleration > $threshold_{accel}$) |
| High braking demand | (brake pedal position > $threshold_{brk\_pedal}$) OR (longitudinal deceleration > $threshold_{decel}$) |

TABLE 1-continued

| Driving Scenario | Rule |
| --- | --- |
| Intersection maneuver | (yaw angle ≅ 90°), where yaw angle = (yaw rate integrated along vehicle trajectory) |
| Merge maneuver | (lateral vehicle motion > threshold$_{merge\_lateral}$) AND (speed$_{cur}$ − speed$_{prev}$ > threshold$_{speed}$) |
| Rough road | (Vertical vehicle motion > threshold$_{roughroad\_vertical}$) |
| Sharp curve locations | (yaw angle ≥ 120°), where yaw angle = (yaw rate integrated along vehicle trajectory) |

It should be noted that the specific thresholds of the rules 212 used to define the driving scenarios may vary or otherwise be tuned according to the sensor data and specific model and type of vehicle 31.

Figure 3:
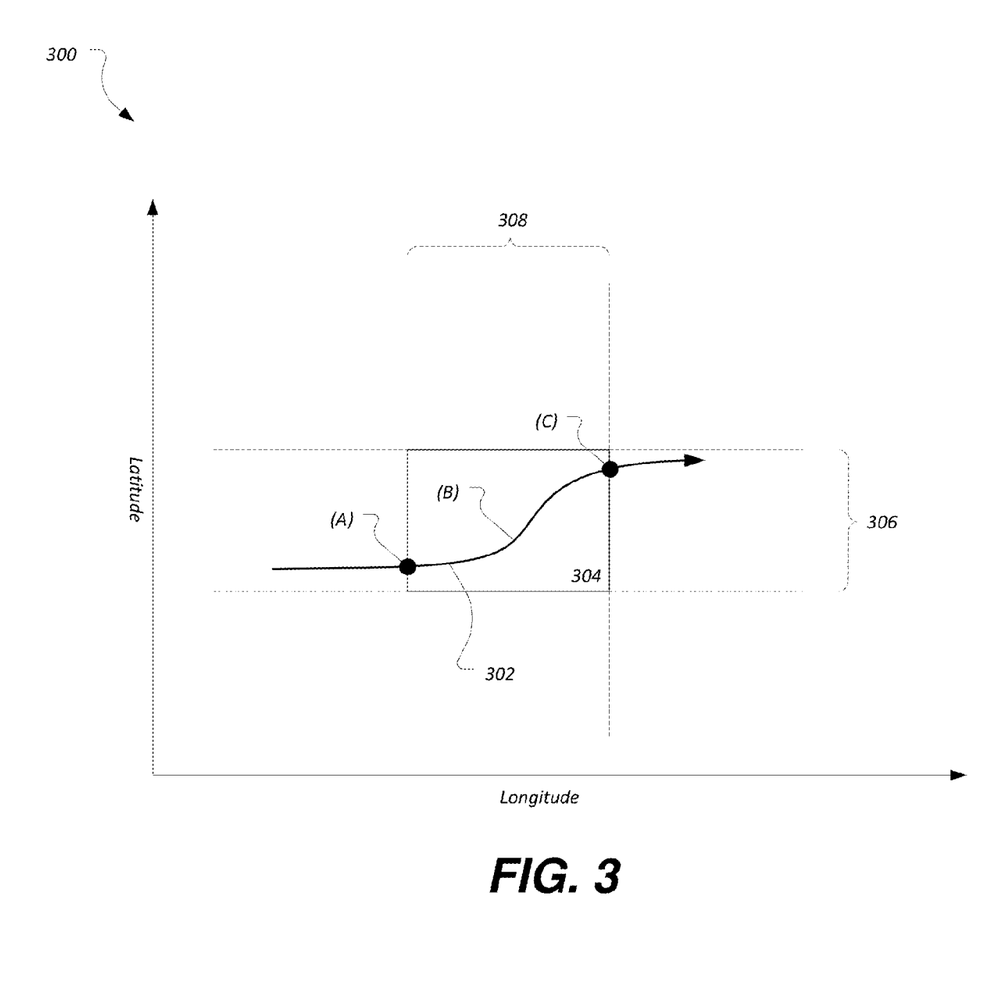
FIG. 3 illustrates an exemplary map including a travel path of the vehicle through a location region for which driving scenario indications may be determined.

FIG. 3 illustrates an exemplary map 300 including a travel path 302 of the vehicle 31 through a location region 304 for which driving scenario indications 214 may be determined. As illustrated, the location region 304 is bounded by a latitude range 306 and a longitude range 308. As further illustrated, the travel path 302 enters the location region 304 upon intersection of the travel path 302 with the location region 304 at point (A), traverses the location region 304 over segment (B), and exits the location region 304 upon intersection of the travel path 302 with the location region 304 again at point (C). Based on the location information 208 of the received inputs, the driving demand and scenario recognition module 210 may identify the current location region 304 in which the vehicle 31 is currently located, e.g., bounded by the latitude range 306 and the longitude range 308.

The driving demand and scenario recognition module 210 may determine driving scenario indications 214 for the travel path 302 based on attempted matching of the received inputs to the set of exemplary rules 212. When traveling or otherwise located within the same location region 304, the driving demand and scenario recognition module 210 may be configured to store the received inputs collected from the system. At a later time, such as upon a determination by the driving demand and scenario recognition module 210 that the vehicle has exited the location region 304 (e.g., at point (C)), the driving demand and scenario recognition module 210 may be configured to analyze the stored inputs according to the rules 212 to determine whether any driving scenario indications 214 should be associated with the location region 304.

The driving demand and scenario recognition module 210 may attempt to match the input data collected along the travel path 302 to the set of rules 212. When a match is found, the driving demand and scenario recognition module 210 may associate the location region 304 with a corresponding driving scenario indication 214.

As one example, to identify whether the location region 304 should be associated with an intersection maneuver, the driving demand and scenario recognition module 210 may compute a yaw angle for the travel path 302 traversal of the location region 304 over segment (B), and may determine whether the yaw angle is approximately 90°. If the driving demand and scenario recognition module 210 determines that the yaw angle is approximately 90°, the driving demand and scenario recognition module 210 may associate the location region 304 with an intersection maneuver driving scenario indication 214.

As another example, to determine whether the location region 304 should be associated with a merge maneuver, the driving demand and scenario recognition module 210 may determine whether lateral vehicle motion information included in the vehicle state 204 information exceeds a threshold amount of lateral motion indicative of a merge action, and further whether a difference in speed of the vehicle at point (C) as compared to point (A) exceeds a threshold difference in speed. If the driving demand and scenario recognition module 210 determines that the criteria match, the driving demand and scenario recognition module 210 may associate the location region 304 with a merge maneuver driving scenario indication 214.

The driving demand and scenario recognition module 210 may be further configured to label or otherwise associate the matched driving scenario indications 214 with location information 208 indicative of the current vehicle 31 location, and send the driving scenario indications 214 to the likelihood learning module 216.

Referring back to FIG. 2, the likelihood learning module 216 may be configured to receive the driving scenario indications 214 determined by the driving demand and scenario recognition module 210, and determine location demand identifiers 218 for the driving scenario indications 214 by performing a likelihood adjustment based on frequency of occurrence. For example, when driving scenario indication 214 of a particular type in a particular location region 304 (i) is recognized, the likelihood learning module 216 may be configured to identify a GPS location range in which the GPS coordinates of that location are included, and determine an initial likelihood for the GPS location range as follows:

$$L_i(GPS_{lat}, GPS_{long}) = p_0, i=1, \ldots, n \quad (1)$$

where $L_i$ is the likelihood at the particular location, $GPS_{lat}$ is a range of latitudes for which the likelihood is calculated, $GPS_{long}$ is a range of longitudes for which the likelihood is calculated, n is the number of locations recognized, and $p_0$ is the initial likelihood. The likelihood learning module 216 may be further configured to store the initial likelihood in association with the GPS location range or other indication of the location region 304.

The likelihood learning module 216 may be further configured to receive additional driving scenario indications 214 determined by the driving demand and scenario recognition module 210. When the likelihood learning module 216 identifies that another driving scenario indication 214 in the particular location region 304 (i) is recognized (e.g., due to association of the driving scenario indication 214 with the same or a similar range of GPS coordinates of $L_i$) and further that the same driving scenario indication 214 been recognized again, the likelihood learning module 216 may update the likelihood for the GPS location range as follows:

$$L_{i+1}(GPS_{lat}, GPS_{long}) = \alpha \cdot L_i + 1(1-\alpha) \cdot p_0, i=1, \ldots, n \quad (2)$$

Where α is a decaying factor, such that more recent driving scenario indications 214 are weighted more heavily in the computation of the likelihood. If a different driving scenario indication 214 is recognized for the particular location region 304 (i), the likelihood learning module 216 may instead update the likelihood for the GPS location range as follows:

$$L_{lat}(GPS_{lat}, GPS_{long}) = \alpha \cdot L_i, i=1, \ldots, n \quad (3)$$

Where, again, α is a decaying factor weighting recent values more heavily in the computation of the likelihood than older values.

As another possibility, likelihood constants may be chosen for $p_0$ in equation ( ) of the form:

$$p_0 = \begin{cases} \gamma(\text{Initialization}) \\ \alpha(\text{Update}) \end{cases} \quad (4)$$

Where γ is an initial weighting factor utilized during initialization of a likelihood value for a GPS location range, and a is an update weighting factor utilized during update of the likelihood value for a GPS location.

When the $L_i$ exceeds a minimum threshold value, the likelihood learning module 216 may be configured to designate a location region 304 as a high driving demand location by associating a location demand identifier 218 with the location region 304. The associated location demand identifier 218 may further include or otherwise reference the computed high likelihood value $L_i$. For example, whenever the likelihood $L_i$ reaches a designated minimum level, the likelihood learning module 216 may regard the corresponding location as being associated with a high enough likelihood for high driving demand for association of the location region 304 with a driving scenario indication 214. On the other hand, if $L_i$ drops below a threshold level, the likelihood learning module 216 may remove any driving scenario indication 214 association with the location region 304 to save memory storage and remove unnecessary location demand identifiers 218.

FIGS. 4A-4D each illustrate exemplary likelihood maps 400 including driving scenario indications 214 associated with location regions 304 of the map 400. Each of the likelihood maps 400 may be determined by the likelihood learning module 216 based on likelihood computations determined by the likelihood learning module 216 as a weighting of the driving scenario indications 214 determined according to the vehicle 31 traversal of the travel path 302.

Figure 4A:
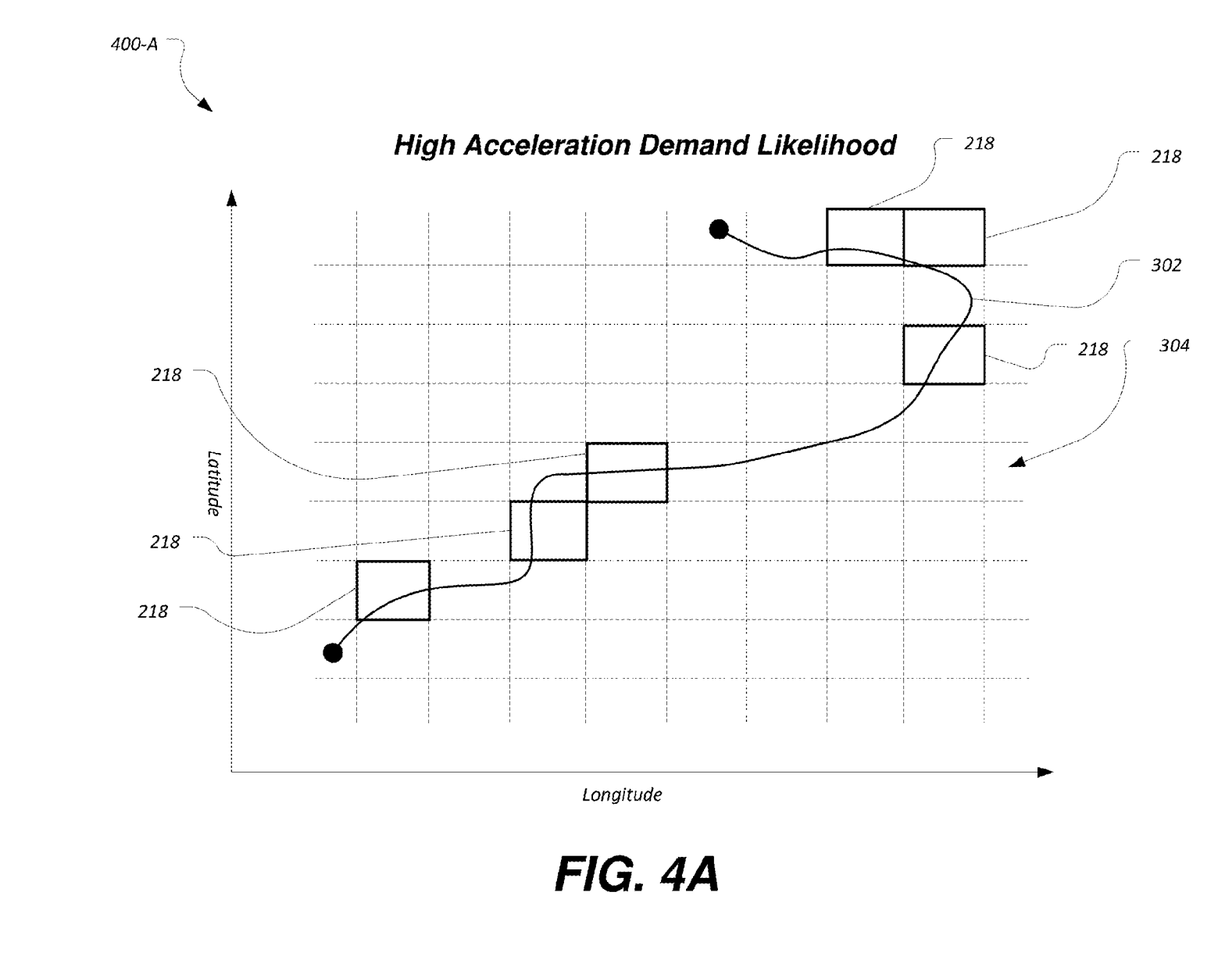
FIG. 4A illustrates an exemplary high acceleration demand likelihood map.

FIG. 4A illustrates an exemplary high acceleration demand likelihood map 400-A. As illustrated, the high acceleration demand likelihood map 400-A includes location demand identifiers 218 determined based upon matching of inputs received due to vehicle 31 travel along the travel path 302 to the conditions of the high acceleration demand rule 212. The travel path 302 of the vehicle 31 may cross multiple location regions 304, and may include, for example, traversal of one or more of local surface streets, arterial streets, and highways. In some cases, the high acceleration location demand identifiers 218 may be learned based on a single or an initial vehicle 31 traversal of the travel path 302, while in other cases, at least some of the location demand identifiers 218 may be updated according to additional vehicle 31 traversals of portions or the entirety of the travel path 302.

As illustrated, location regions 304 including relatively higher location demand identifiers 218 are indicated in the high acceleration likelihood map 400-A as within solid lines, while location regions 304 including relatively lower location demand identifiers 218 are indicated as within dashed lines. Notably, the location regions 304 of the high acceleration likelihood map 400-A matched by the high acceleration demand rule 212 include straightaway road portions.

While only two gradations of location demand identifiers 218 are represented in the map 400-A, it should be noted that in many examples more than two likelihood levels may be available for association with location regions 304. For instance, a location region 304 for which multiple vehicle 31 traversals match the high acceleration demand rule 212 may be associated with a higher level of likelihood than a location region 304 for which fewer vehicle 31 traversals match the high acceleration demand rule 212. Moreover, as discussed above with respect to the equations (1) through (4), matches to the high acceleration demand rule 212 that are more recent in time may be more heavily weighted in the computation of the level of likelihood associated with the location region 304.

It should be noted that the number, size and layout of the location regions 304 as shown is merely exemplary. For example, larger, smaller, and differently arranged location regions 304 may be utilized as well. As another example, location regions 304 may not necessarily each be the same shape, size, or encompass the same area. It should further be noted that location regions 304 should be sized such that the location regions 304 provide adequate resolution to differentiate road features such intersections, freeways and residential streets. At the same time, the location regions 304 should not being overly small such that the location regions 304 cover only a portion of a feature (e.g., only part of a 90° turn) and fail to reliably match the rules 212, or are too small to provide sufficient predictive value over adjacent sections of roadway to which the same location demand identifiers 218 should apply.

Figure 4B:
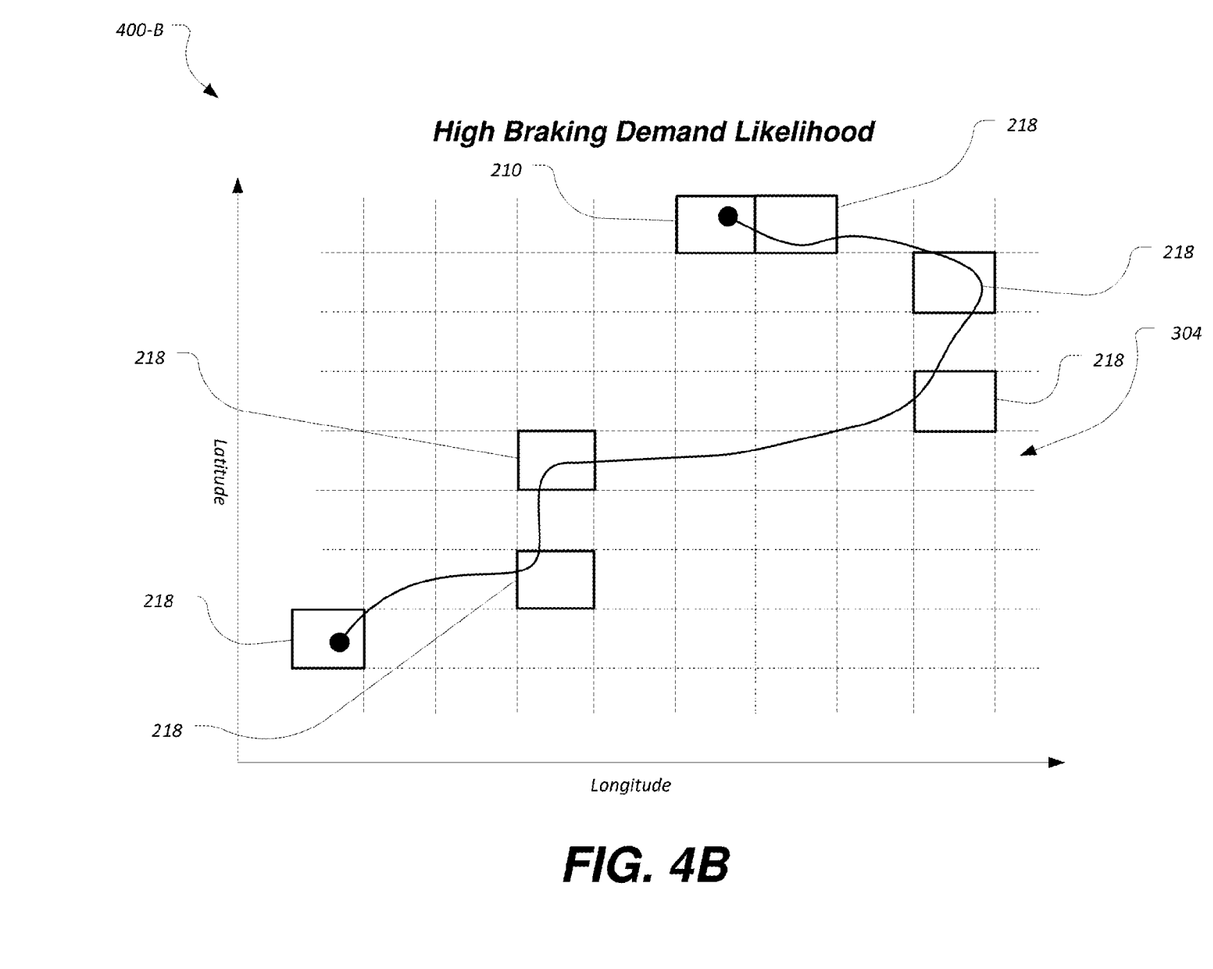
FIG. 4B illustrates an exemplary high braking demand likelihood map.

FIG. 4B illustrates an exemplary high braking demand likelihood map 400-B. As illustrated, the high braking demand likelihood map 400-B includes location demand identifiers 218 determined based upon matching of inputs received due to vehicle 31 travel along the travel path 302 to the conditions of the high braking demand rule 212. Similar to as discussed above with respect to the map 400-A, for each of the location regions 304, if the likelihood learning module 216 determines that the inputs received due to vehicle 31 travel within the location region 304 match the conditions of the high braking demand rule 212, then the likelihood learning module 216 may associate a relatively higher likelihood location demand identifier 218 corresponding the high braking demand rule 212 with the corresponding location region 304. Notably, the location regions 304 of the high braking likelihood map 400-B matched by the high braking demand rule 212 include road portions including turns and route endpoints.

Figure 4C:
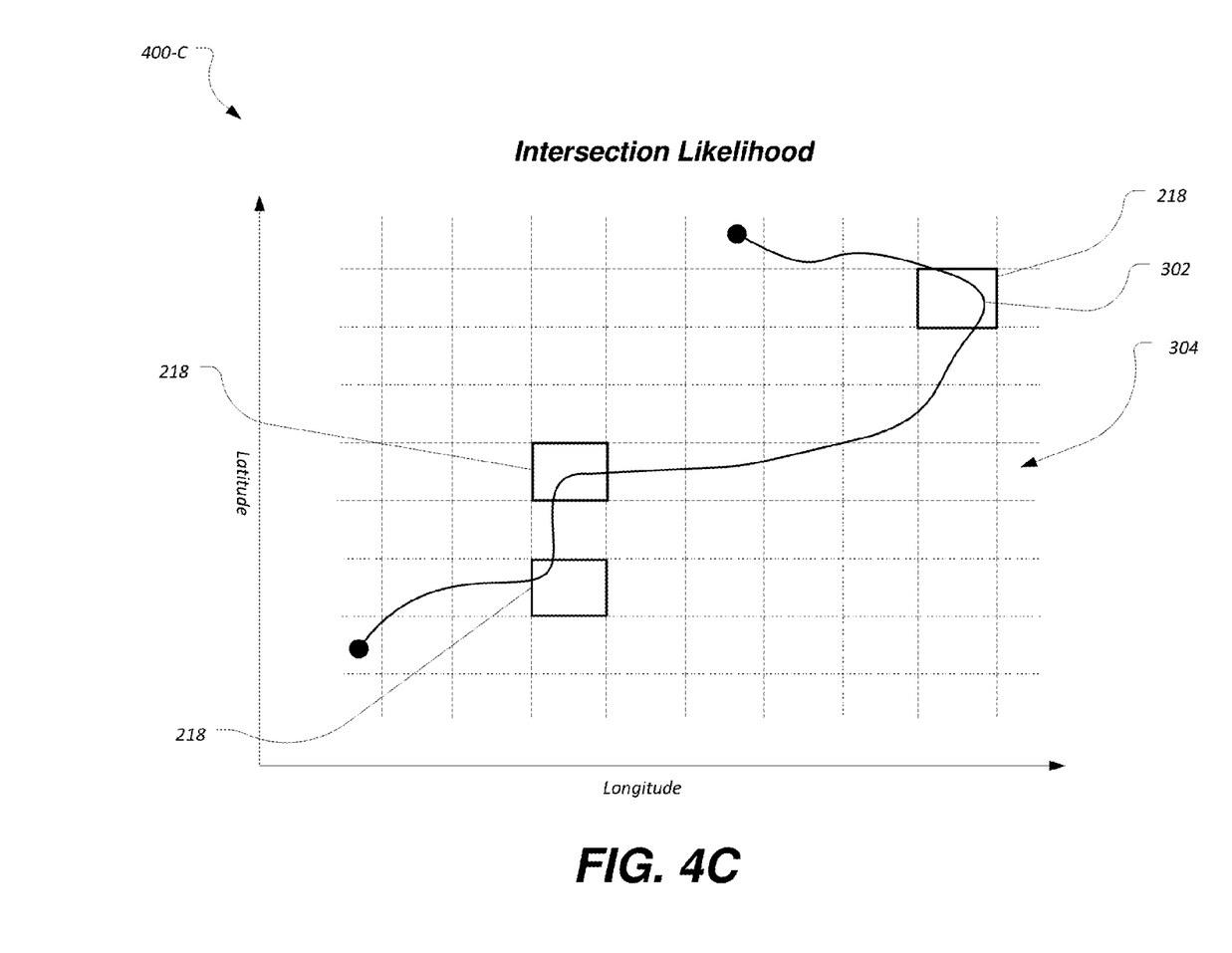
FIG. 4C illustrates an exemplary intersection likelihood map.

FIG. 4C illustrates an exemplary intersection likelihood map 400-C. As illustrated, the intersection likelihood map 400-C includes location demand identifiers 218 determined based upon matching of inputs received due to vehicle 31 travel along the travel path 302 to the conditions of the intersection maneuver rule 212. Similar to as discussed above with respect to the map 400-A, for each of the location regions 304, if the likelihood learning module 216 determines that the inputs received due to vehicle 31 travel within the location region 304 match the conditions of the intersection maneuver rule 212, then the likelihood learning module 216 may associate a relatively higher likelihood location demand identifier 218 corresponding the intersection maneuver rule 212 with the corresponding location region 304. Notably, the location regions 304 of the intersection likelihood map 400-C matched by the intersection maneuver rule 212 include road portions including turns of approximately 90°.

Figure 4D:
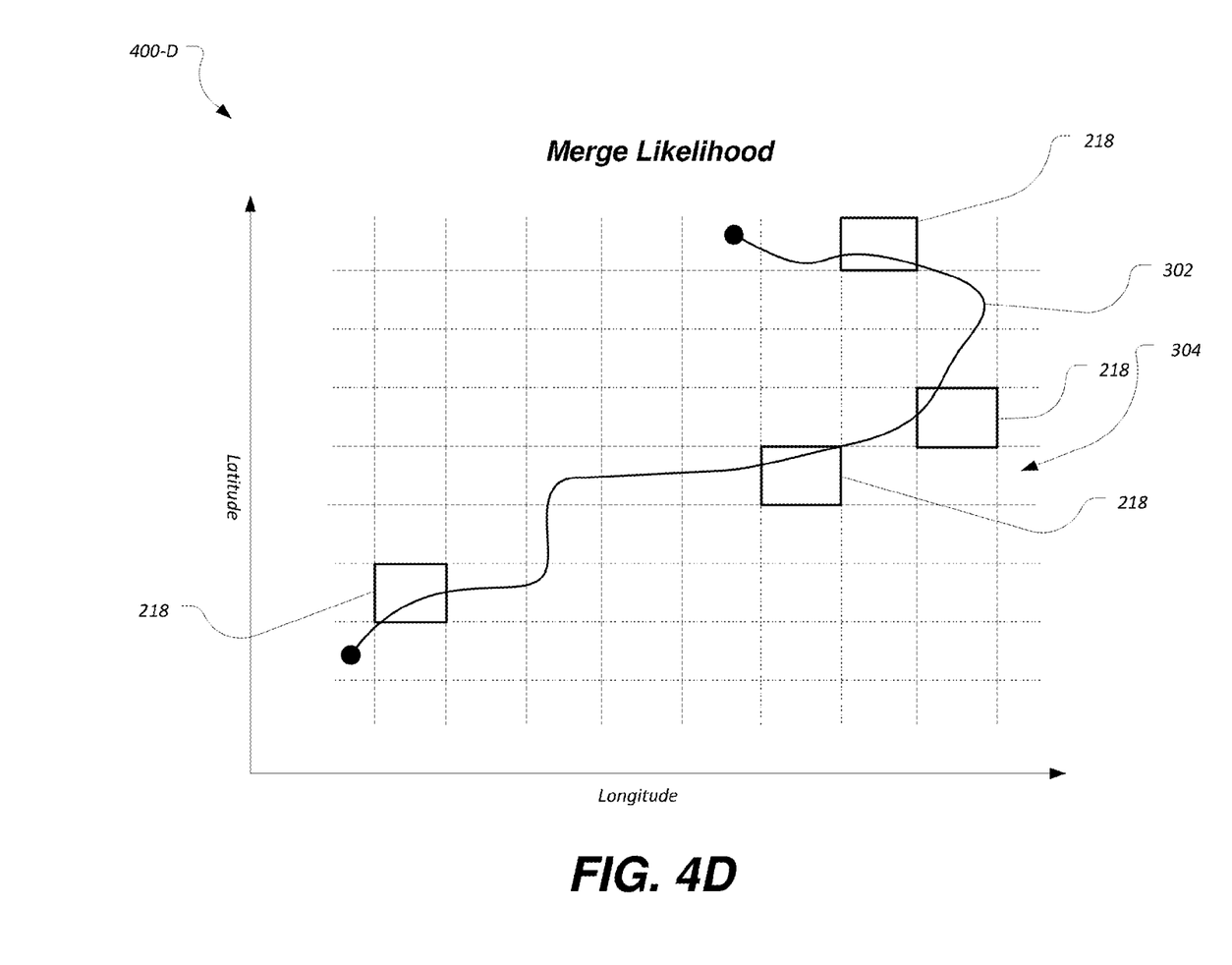
FIG. 4D illustrates an exemplary merge likelihood map.

FIG. 4D illustrates an exemplary merge likelihood map 400-D. As illustrated, the merge likelihood map 400-D includes location demand identifiers 218 determined based upon matching of inputs received due to vehicle 31 travel along the travel path 302 to the conditions of the merge maneuver rule 212. Similar to as discussed above with respect to the map 400-A, for each of the location regions 304, if the likelihood learning module 216 determines that the inputs received due to vehicle 31 travel within the location region 304 match the conditions of the merge maneuver rule 212, then the likelihood learning module 216 may associate a relatively higher likelihood location demand identifier 218 corresponding the merge maneuver rule 212 with the corresponding location region 304. Notably, the location regions 304 of the merge likelihood map 400-D matched by the merge maneuver rule 212 include road portions including lateral vehicle 31 motion and change in vehicle 31 speed.

Referring back to FIG. 2, the likelihood learning module 216 may provide the location demand identifiers 218 to the self-tuning predictive driving demand module 222. The self-tuning predictive driving demand module 222 may receive the location demand identifiers 218 and may provide predicted information about upcoming high demand and scenario situations to the personalized driver adaptation module 224 to reconfigure the vehicle 31. For example, when the self-tuning predictive driving demand module 222 determines that a likelihood $L_i$ of a location demand identifier 218 associated with a location region 304 meets or exceeds a designated tunable sensitivity level 220 (e.g., 0.85 out of 1), the self-tuning predictive driving demand module 222 may be configured to regard the corresponding location region 304 as being a high driving demand location. It should be noted that the sensitivity level 220 may vary according to the type of location demand identifier 218. For instance, for a relatively more consistent type of location demand identifier 218 (e.g., a roadway characteristic such as intersection proximity), a relatively higher sensitivity level 220 may be utilized due to the higher accuracy of the location demand identifier 218. In contrast, for a relatively less consistent type of location demand identifier 218 (e.g., acceleration likelihood consistent with the driver's style), a lower threshold may be beneficial.

The self-tuning predictive driving demand module 222 may be configured to make information available to the personalized driver adaptation module 224 regarding which location regions 304 meets or exceeds the designated tunable sensitivity level 220 for each type of driving scenario indication 214. For example, self-tuning predictive driving demand module 222 may identify which location regions 304 may require higher driver demand due to presence of merge situations, and also identify which location regions 304 may require higher driver demand due to a high likelihood of braking being required.

The personalized driver adaptation module 224 may be configured to perform anticipatory changes to vehicle settings to improve maneuverability based on historical identification of areas requiring higher driver attention. For example, when the vehicle approaches the location region 304 identified by self-tuning predictive driving demand module 222 as requiring higher driver demand, the personalized driver adaptation module 224 may be configured to apply a settings update 226 to automatically place the vehicle in augmented settings to improve vehicle maneuverability with respect to the particular likely type of driving situation.

For example, when the personalized driver adaptation module 224 determines that the vehicle 31 is approaching a location region 304 associated with high acceleration demand, the personalized driver adaptation module 224 may be configured to request the vehicle 31 engine start/stop system to start the internal combustion engine, thereby reducing vehicle 31 latency in responding to a likely acceleration request from the vehicle 31 driver. As another example, when the personalized driver adaptation module 224 determines that the vehicle 31 is approaching a location region 304 associated with high braking demand scenarios, the personalized driver adaptation module 224 may be configured to request the vehicle 31 braking system to pre-charge brake pressure, thereby reducing vehicle 31 latency in responding to a likely braking request from the vehicle 31 driver. Similarly, the personalized driver adaptation module 224 may be configured to automatically update other vehicle 31 settings, such as steering and suspension settings, thereby improving vehicle 31 response to likely driver input in performing intersection maneuvers (e.g., by tightening suspension settings and pre-charging brakes), merge maneuvers (e.g., by tightening suspension settings, downshifting vehicle 31 gear, etc.) or traversals of rough road (e.g., by raising suspension clearance height or increasing damping).

Figure 5:
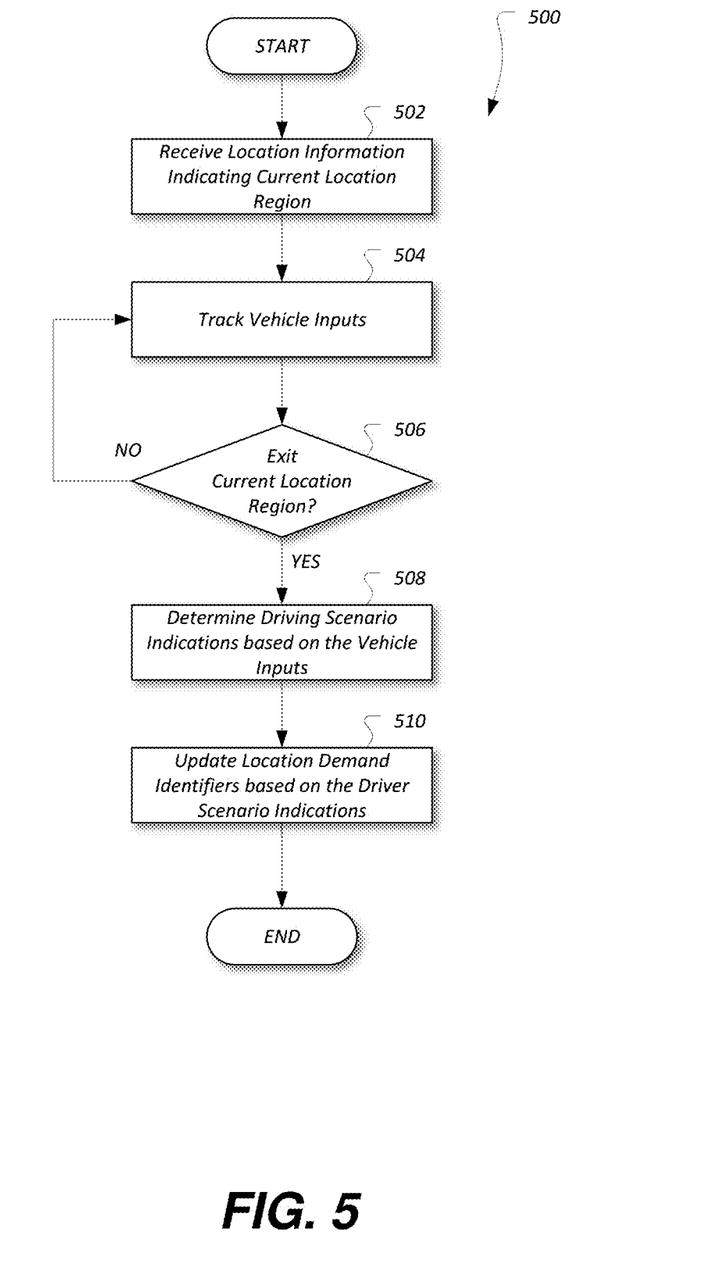
FIG. 5 illustrates an exemplary process for determining location demand identifiers associated with location regions.

FIG. 5 illustrates an exemplary process 500 for determining location demand identifiers 218 associated with location regions 304. The process 500 may be performed, for example, by one or more vehicle 31 controllers, such as the VCS 1.

At block 502, the vehicle 31 receives location information 208 indicating a current location region 304. The location information 208 may be retrieved, for example, via a vehicle 31 bus or otherwise from a vehicle system, according to information provided to the GPS input 24 of the CPU 3. Based on the location information 208 of the received inputs, the driving demand and scenario recognition module 210 may identify the current location region 304 in which the vehicle 31 is currently located, e.g., the latitude range 306 and the longitude range 308 of the location region 304 in which the location information 208 is included.

At block 504, the vehicle 31 tracks vehicle 31 inputs. For example, while traveling or otherwise located within the same location region 304, the driving demand and scenario recognition module 210 may be configured to store the received inputs. The vehicle 31 inputs may include, for example, driver activity 202, vehicle state 204, vehicle environment 206, and location information 208 from vehicle 31 systems and sensors.

At decision block 506, the vehicle 31 determines whether the vehicle 31 has exited or is exiting the current location region 304. For example, based on the location information 208 of the received inputs, the driving demand and scenario recognition module 210 may identify the current location region 304 in which the vehicle 31 is currently located, e.g., the latitude range 306 and the longitude range 308 of the location region 304 in which the location information 208 is included. When the driving demand and scenario recognition module 210 identifies that the vehicle 31 has exited the location region 304 (e.g., at point (C) as illustrated in FIG. 3), control passes to block 508. Otherwise control passes to block 504 to continue tracking the vehicle 31 inputs.

At block 508, the vehicle 31 determines driving scenario indications 214 based on input analysis of the received inputs for the location region 304. For example, and as illustrated with respect to FIG. 3, the driving demand and scenario recognition module 210 may attempt to match the input data collected along the travel path 302 to the set of rules 212. When a match is found, the driving demand and scenario recognition module 210 may associate the corresponding driving scenario indication 214 with the travel path 302. The driving demand and scenario recognition module 210 may further label or otherwise associate the matched driving scenario indications 214 with location information 208 indicative of the current vehicle 31 location.

At block 510, the vehicle 31 updates location demand identifiers 218 for the location region 304 based on the determined driving scenario indications 214. For example, and as illustrated with respect to FIGS. 4A-4D, the likelihood learning module 216 may determine location demand identifiers 218 based on a weighting of the driving scenario indications 214. For instance, the location demand identifiers 218 may be updated based on a weighting of the driving scenario indications 214 with previously determined driving scenario indications 214 determined during previous vehicle traversals of the travel path 302 over the current location region 304. After block 510, the process 500 ends.

Figure 6:
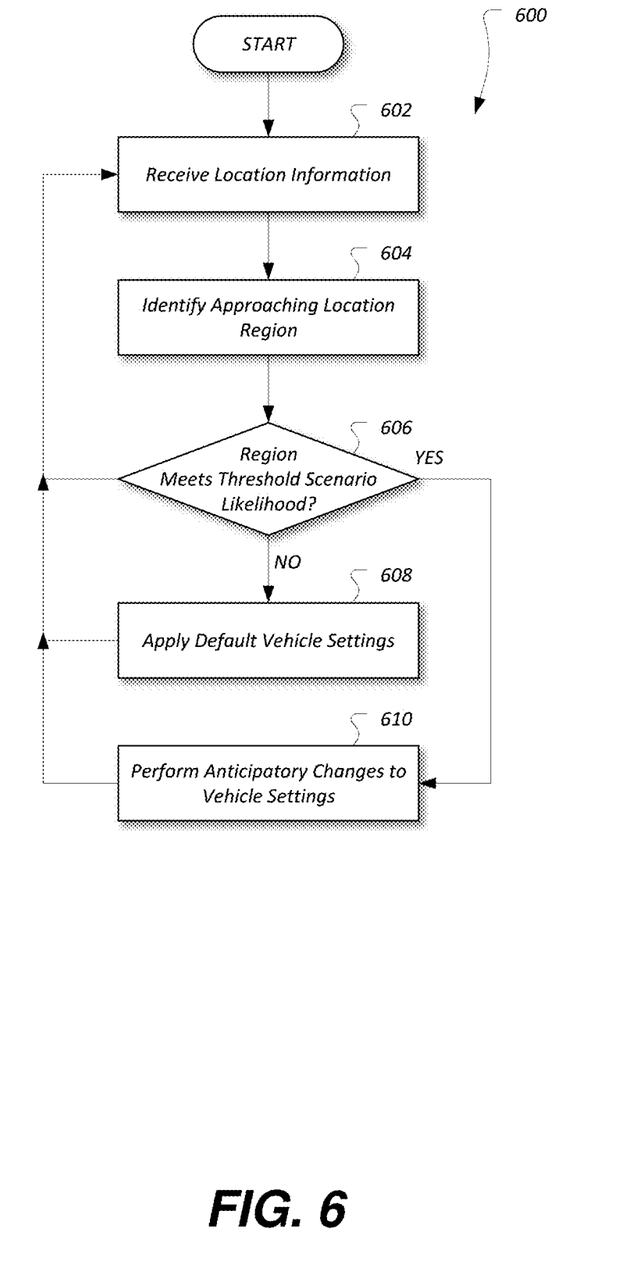
FIG. 6 illustrates an exemplary process for performing settings updates to provide anticipatory changes to vehicle settings, based on identification of location regions associated with location demand identifiers.

FIG. 6 illustrates an exemplary process 600 for performing settings updates 226 to provide anticipatory changes to vehicle settings, based on identification of location regions 304 associated with location demand identifiers 218. These vehicle settings updates may, for example, improve maneuverability of the vehicle 31 during the anticipated upcoming driving scenario. As with the process 500, the process 600 may be performed, for example, by one or more vehicle 31 controllers, such as the VCS 1.

At block 602, the vehicle 31 receives location information 208. The location information 208 may be retrieved, for example, via a vehicle 31 bus or otherwise from a vehicle system, according to information provided to the GPS input 24 of the CPU 3.

At block 604, the vehicle 31 identifies an approaching location region 304. Based on the location information 208 of the received inputs, the personalized driving adaptation module 224 may identify the approaching location region 304 in which the vehicle 31 is likely to soon be located, e.g., the latitude range 306 and the longitude range 308 of the location region 304 in which a projection of the heading and speed of the location information 208 indicates.

At decision block 606, the vehicle 31 determines whether the approaching location region 304 has at least a threshold level of likelihood of any associated location demand identifiers 218. For example, the location demand identifiers 218 may be determined, e.g., according to a process such as the process 500 discussed in detail above. When the self-tuning predictive driving demand module 222 determines that a likelihood $L_i$ of a location demand identifier 218 associated with the approaching location region 304 meets or exceeds a designated tunable sensitivity level 220, the self-tuning predictive driving demand module 222 regards the corresponding location region 304 as being a high driving demand location. If not, control passes to block 608. If so, control passes to block 610.

At block 608, the vehicle 31 applies default settings. For example, the personalized driver adaptation module 224 may be configured to provide a settings update 226 to the vehicle 31 including default settings. The default settings may include, for example, removal of any default brake pre-charging, suspension, and vehicle start/stop overrides, or other re-establishment of default vehicle 31 settings and behavior. After block 608, control passes to block 602.

At block 610, the vehicle 31 applies anticipatory changes to vehicle 31 settings. For example, the personalized driver adaptation module 224 may be configured to provide a settings update 226 to the vehicle 31 including augmented settings to improve vehicle maneuverability with respect to the particular likely type of driving situation. For example, when the personalized driver adaptation module 224 determines that the vehicle 31 is approaching a location region 304 associated with high acceleration demand, the personalized driver adaptation module 224 may be configured to request the vehicle 31 engine start/stop system to start the internal combustion engine, thereby reducing vehicle 31 latency in responding to a likely acceleration request from the vehicle 31 driver. As another example, when the personalized driver adaptation module 224 determines that the vehicle 31 is approaching a location region 304 associated with high braking demand scenarios, the personalized driver adaptation module 224 may be configured to request the vehicle 31 braking system to pre-charge brake pressure, thereby reducing vehicle 31 latency in responding to a likely braking request from the vehicle 31 driver. After block 610, control passes to block 602.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising: at least one vehicle system including an engine start/stop system, a braking system, a transmission, or a suspension system; and a vehicle processor configured to: track vehicle input during vehicle traversal of a travel path within a location region, match the vehicle input against a condition of a rule, such that when the vehicle input matches the condition, a driving scenario indication of a type corresponding to the rule is associated with the location region, update a location demand identifier associated with the location region based on the driving scenario indication, identify the location demand identifier according to vehicle approach to the location region; when the location demand identifier exceeds a vehicle sensitivity level, provide a settings update to the at least one vehicle system to improve vehicle maneuverability during occurrence of the driving scenario; analyze second vehicle inputs tracked during a second traversal of the travel path within the location region by matching the second vehicle input to the rule; determine a second driving scenario indication of the type corresponding to the rule; and update a location demand identifier associated with the location region based on a weighting of the driving scenario indication and second driving scenario indication.

2. The system of claim 1, wherein the vehicle processor is further configured to analyze the vehicle inputs upon condition that the vehicle exits the location region.

3. The system of claim 1, wherein the vehicle processor is further configured to update a location demand identifier associated with the location region based on a weighting of the driving scenario indication and a driving scenario indication determined from a previous vehicle traversal of the travel path.

4. The system of claim 3, wherein the weighting utilizes a decaying factor weighting driving scenario indications determined from more recent traversals of the travel path more heavily in computation of the location demand identifier than driving scenario indications determined from less recent traversals of the travel path.

5. The system of claim 1, wherein the vehicle processor is further configured to analyze the vehicle input by matching the vehicle input to a second rule, such that when the vehicle input matches a condition of the second rule, a driving scenario indication of a second type different from the type and corresponding to the second rule is associated with the location region.

6. A system comprising: at least one vehicle system including an engine start/stop system, a braking system, a transmission, or a suspension system; and a vehicle processor configured to: identify a location demand identifier for an approaching location region, the location demand identifier determined according to vehicle input satisfying a rule identifying a driving scenario and indicative of a level of likelihood of occurrence of the driving scenario; when the location demand identifier exceeds a vehicle sensitivity level, provide a settings update to the at least one vehicle system to improve vehicle maneuverability during occurrence of the driving scenario; track vehicle input during vehicle traversal of a travel path within a location region; analyze the vehicle input by matching the vehicle input to a rule, such that when the vehicle input matches a condition of the rule, a driving scenario indication of a type corresponding to the rule is associated with the location region; and update a location demand identifier associated with the location region based on a weighting of the driving scenario indication and a driving scenario indication determined from a previous vehicle traversal of the travel path.

7. The system of claim 6, wherein the vehicle processor is further configured to determine anticipatory changes to include the settings update according to a type of the driving scenario.

8. The system of claim 7, wherein the settings update is based on comparing the type of driving scenario to a configuration of anticipatory changes including at least three of: (i) the type of the driving scenario is high acceleration demand, and the anticipatory changes include to request a vehicle engine start/stop system to start an internal combustion engine of the vehicle; (ii) the type of the driving scenario is high braking demand, and the anticipatory changes include to request a vehicle braking system to pre-charge brake pressure; (iii) the type of the driving scenario is intersection maneuver, and the anticipatory changes include at least one of to request the vehicle braking system to pre-charge brake pressure or to request a vehicle suspension system to adjust suspension characteristics; (iv) the type of the driving scenario is merge maneuver, and the anticipatory changes include at least one of to request the vehicle suspension system to adjust suspension characteristics and to request a vehicle transmission to downshift; or (v) the type of the driving scenario is rough road, and the anticipatory changes include at least one of to request the vehicle suspension system to adjust suspension characteristics.

9. The system of claim 6, wherein the vehicle processor is further configured to identify the vehicle sensitivity level based on the driving scenario.

10. The system of claim 6, wherein the vehicle processor is further configured to update a location demand identifier associated with the location region based on a weighting of the driving scenario indication and a driving scenario indication determined from a previous vehicle traversal of the travel path.

11. The system of claim 10, wherein the weighting utilizes a decaying factor weighting driving scenario indications determined from more recent traversals of the travel path more heavily in computation of the location demand identifier than driving scenario indications determined from less recent traversals of the travel path.

12. A method comprising: identifying a location demand identifier for an approaching location region, the location demand identifier determined according to vehicle input satisfying a rule identifying a driving scenario and indicative of a level of likelihood of occurrence of the driving scenario; when the location demand identifier exceeds a vehicle sensitivity level, providing, by a vehicle processor, a settings update to the vehicle to modify vehicle maneuverability during occurrence of the driving scenario, the settings update based on comparing a type of the driving scenario to a configuration of anticipatory changes and including at least one of: (i) the type of the driving scenario including high acceleration demand, and the anticipatory changes including to request a vehicle engine start/stop system to start an internal combustion engine of the vehicle; (ii) the type of the driving scenario including high braking demand, and the anticipatory changes including to request a vehicle braking system to pre-charge brake pressure; (iii) the type of the driving scenario including intersection maneuver, and the anticipatory changes including at least one of to request the vehicle braking system to pre-charge brake pressure or to request a vehicle suspension system to adjust suspension characteristics; (iv) the type of the driving scenario including a merge maneuver, and the anticipatory changes including at least one of to request the vehicle suspension system to adjust suspension characteristics and to request a vehicle transmission to downshift; or (v) the type of the driving scenario including rough road, and the anticipatory changes including at least one of to request the vehicle suspension system to adjust suspension characteristics; tracking vehicle input during vehicle traversal of a travel path within a location region; analyzing the vehicle input by matching the vehicle input to a rule, such that when the vehicle input matches a condition of the rule, a driving scenario indication of a type corresponding to the rule is associated with the location region; and updating a location demand identifier associated with the location region based on a weighting of the driving scenario indication and a driving scenario indication determined from a previous vehicle traversal of the travel path.

13. The method of claim 12, further comprising determining, by the vehicle processor, anticipatory changes to include the settings update according to a type of the driving scenario.

14. The method of claim 12, further comprising identifying, by the vehicle processor, the vehicle sensitivity level based on the driving scenario.

15. The method of claim 12, further comprising updating, by the vehicle processor, a location demand identifier associated with the location region based on a weighting of the driving scenario indication and a driving scenario indication determined from a previous vehicle traversal of the travel path, and the weighting utilizing a decaying factor weighting driving scenario indications determined from more recent traversals of the travel path more heavily in computation of the location demand identifier than driving scenario indications determined from less recent traversals of the travel path.

\* \* \* \* \*